United States Patent
Wittkopp et al.

(10) Patent No.: US 8,506,445 B2
(45) Date of Patent: Aug. 13, 2013

(54) SELECTABLE TORQUE TRANSMITTING DEVICE

(75) Inventors: Scott H. Wittkopp, Ypsilanti, MI (US); James M. Hart, Belleville, MI (US); Clinton E. Carey, Highland, MI (US)

(73) Assignee: GM Global Technology Operations LLC, Detriot, MI (US)

( * ) Notice: Subject to any disclaimer, the term of this patent is extended or adjusted under 35 U.S.C. 154(b) by 818 days.

(21) Appl. No.: 12/694,917

(22) Filed: Jan. 27, 2010

(65) Prior Publication Data

US 2011/0183806 A1 Jul. 28, 2011

(51) Int. Cl.
*F16H 3/44* (2006.01)

(52) U.S. Cl.
USPC .......................................... 475/318; 192/55.1

(58) Field of Classification Search
USPC ............... 192/12 B, 46, 47, 48.3, 48.5, 53.1, 192/55.1, 56.42, 56.53, 56.56, 56.61; 464/43; 475/281, 283, 287, 289, 291, 292, 312, 318, 475/324

See application file for complete search history.

(56) References Cited

U.S. PATENT DOCUMENTS

| | | | | | |
|---|---|---|---|---|---|
| 3,295,394 | A | * | 1/1967 | Whateley | 475/142 |
| 4,224,841 | A | * | 9/1980 | Crooks | 475/117 |
| 4,706,520 | A | * | 11/1987 | Sivalingam | 475/140 |
| 2009/0005212 | A1 | * | 1/2009 | Maguire et al. | 475/323 |
| 2009/0084653 | A1 | * | 4/2009 | Holmes | 192/41 A |
| 2010/0140041 | A1 | * | 6/2010 | Wittkopp et al. | 192/66.32 |

\* cited by examiner

*Primary Examiner* — Justin Holmes
*Assistant Examiner* — Huan Le

(57) ABSTRACT

A torque transmitting device includes a first race, a second race, and a biasing member. The torque transmitting device selectively transmits a torque in a rotational direction between a first member and a second member. The second member includes a surface that defines an annular bore having a decreasing diameter in an axial direction. The second race opposes the first race and includes a surface that opposes the second member and has the decreasing diameter in the axial direction. The first race and the second race define a predetermined torque limit. The biasing element biases the second race against the second member with a predetermined force that contributes to a predetermined holding torque between the surface of the second race and the surface of the second member that is less than the predetermined torque limit.

23 Claims, 3 Drawing Sheets

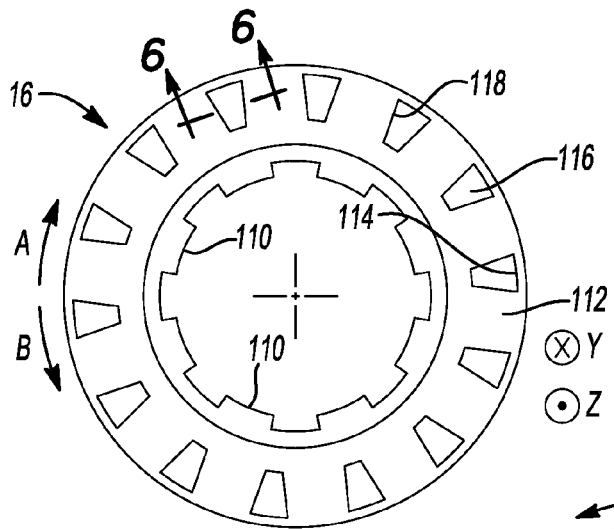
_Fig-3_
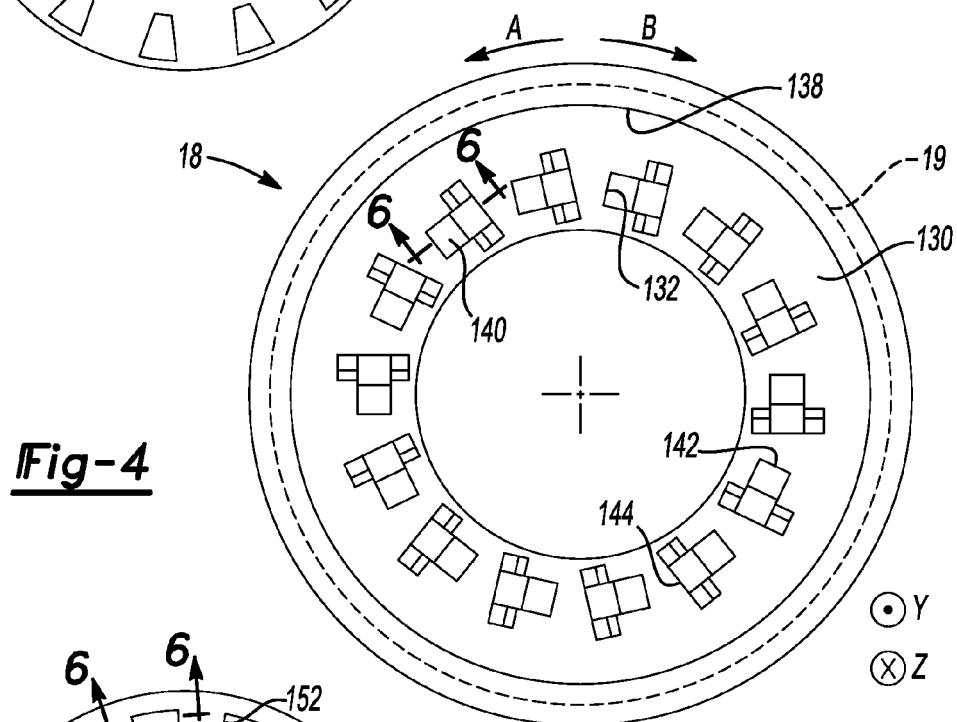
_Fig-4_
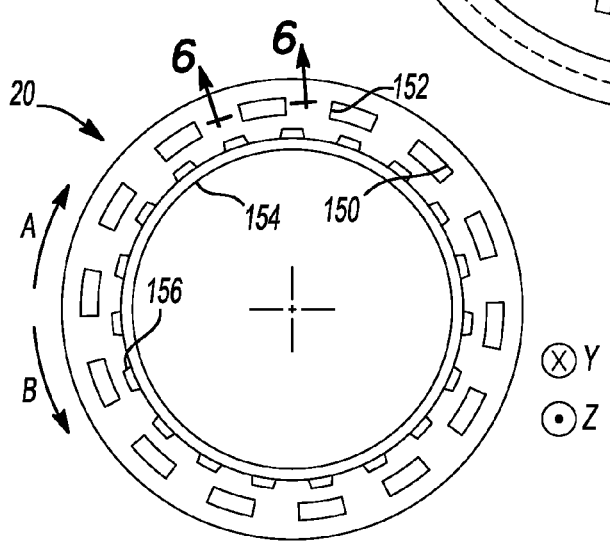
_Fig-5_

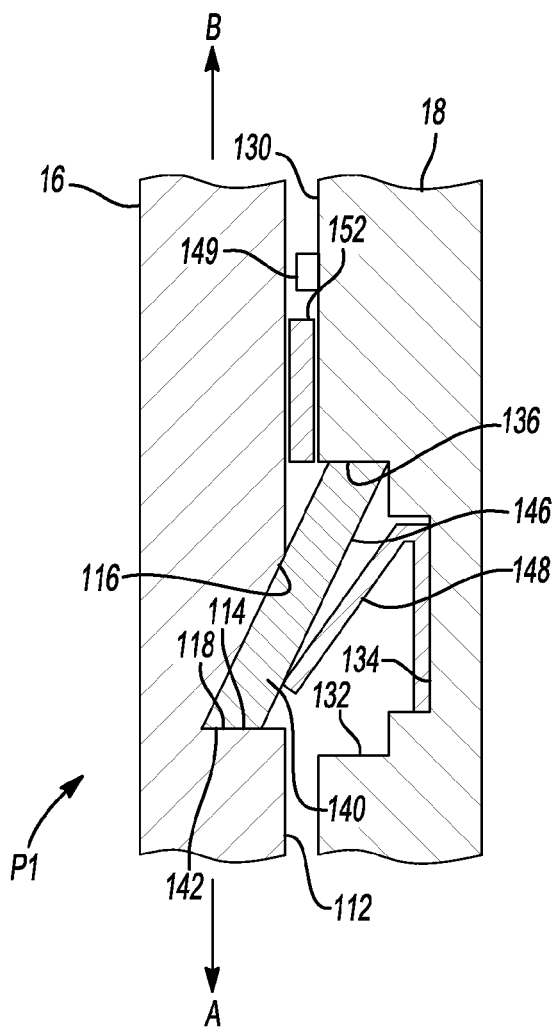
_Fig-6A_
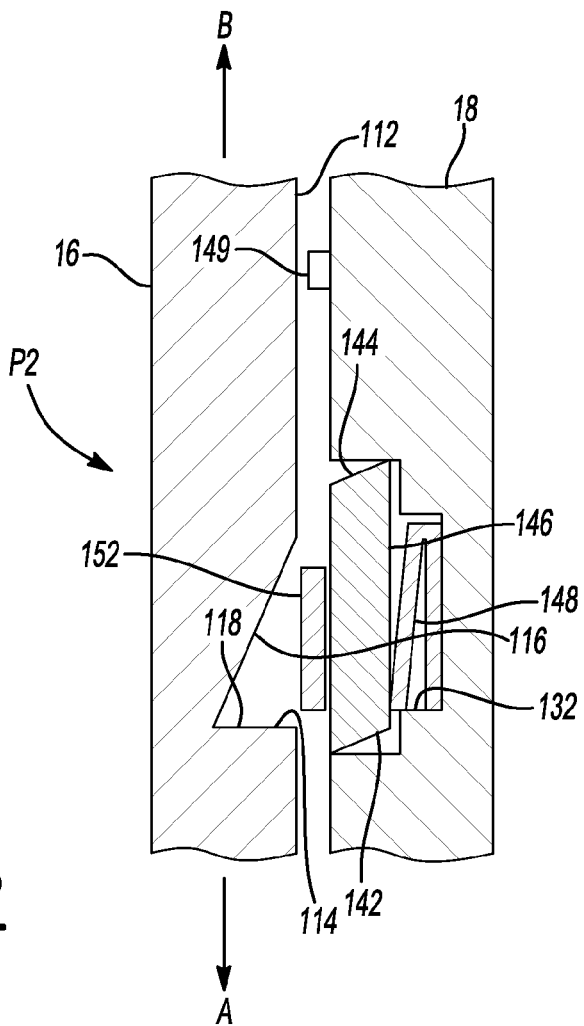
_Fig-6B_

SELECTABLE TORQUE TRANSMITTING DEVICE

TECHNICAL FIELD

The present invention relates to torque transmitting devices, and more particularly to selectable torque transmitting devices with protection against torque overload of one-way clutches.

BACKGROUND

The statements in this section merely provide background information related to the present disclosure and may or may not constitute prior art.

Automatic transmissions provide a plurality of forward and reverse speed or gear ratios by selectively actuating one or more brakes or clutches. One type of brake or clutch useful in automatic transmissions is known as a selectable one-way clutch (SOWC). A SOWC may include a selectable "locked" mode in one rotational direction and a "freewheel" mode in the opposite rotational direction. A one-way or selectable one-way clutch is designed with a torque limit that is moderately higher than the expected operating torque of the system. Exceeding the torque limit may cause permanent damage to the one-way clutch. Due to certain conditions, the SOWC may inadvertently engage when the clutch is rotating in the lockable direction. Inadvertent engagement may cause the torque through the SOWC to exceed the torque limit (i.e., cause a torque spike), thereby possibly causing permanent damage or failure of the SOWC.

One solution to account for torque spikes includes designing one-way clutches with a torque limit high enough to withstand the high torque spikes so that the one-way clutch is not damaged. However, designing the one-way clutch with a higher torque limit often results in more mass, higher cost, and more spin loss in the one-way clutch. Thus, there is a need for a new and improved torque transmitting device that protects the one-way clutch from torque spikes in excess of the expected operating torque while minimizing increases in mass, cost, and inefficiencies.

SUMMARY

In an aspect of the present invention, a torque transmitting device includes a first race, a second race, and a biasing member. The torque transmitting device transmits a torque in a rotational direction between a first member and a second member. The second member includes a surface that defines an annular bore having a decreasing diameter in an axial direction. The first race is rotationally coupled to the first member. The second race opposes the first race and includes a surface that opposes the surface of the second member and has the decreasing diameter in the axial direction. The biasing element biases the second race against the second member with a predetermined force. The torque transmitting device selectively transmits torque in the rotational direction and the first race and the second race define a predetermined torque limit. The predetermined force of the biasing member contributes to a predetermined holding torque between the surface of the second race and the surface of the second member that is less than the predetermined torque limit between the first race and the second race. The second race rotates with respect to the second member when the torque exceeds the predetermined holding torque.

In another aspect of the present invention, the first member is a rotatable member and the second member is a stationary member.

In yet another aspect of the present invention, the stationary member is rotatably coupled to a transmission case in a vehicle transmission.

In yet another aspect of the present invention, the rotatable member is a gear member of a planetary gear set in a vehicle transmission.

In yet another aspect of the present invention, the surface of the second race is substantially conical in shape.

In yet another aspect of the present invention, the predetermined holding torque is about 50% more than a maximum expected operating torque between the first member and the second member.

In yet another aspect of the present invention, the biasing member permanently biases the second race in the axial direction.

In yet another aspect of the present invention, the biasing member is a disc spring.

In yet another aspect of the present invention, the torque transmitting device further includes a selector plate disposed between the first race and the second race to selectively actuate the torque transmitting device. The selector plate has at least one stop with the second race to substantially maintain alignment with the second race when the torque exceeds the predetermined holding torque.

In yet another aspect of the present invention, the second member is a female cone of a cone clutch and the female cone is splined along an outer diameter to a transmission case.

Further areas of applicability will become apparent from the description provided herein. It should be understood that the description and specific examples are intended for purposes of illustration only and are not intended to limit the scope of the present invention.

BRIEF DESCRIPTION OF THE DRAWINGS

FIG. 3 is an end view of a first race of a one-way clutch in accordance with an embodiment of the present invention;

FIG. 4 is an end view of a second race of a one-way clutch in accordance with an embodiment of the present invention;

FIG. 5 is an end view of a selector plate in accordance with an embodiment of the present invention;

FIG. 6A is a cross-sectional side view of a portion of a torque transmitting device at section 6-6 in an engaged state in accordance with an embodiment of the present invention; and FIG. 6B is a cross-sectional side view of a portion of a torque transmitting device at section 6-6 in a disengaged state in accordance with an embodiment of the present invention.

DETAILED DESCRIPTION

Figure 1:
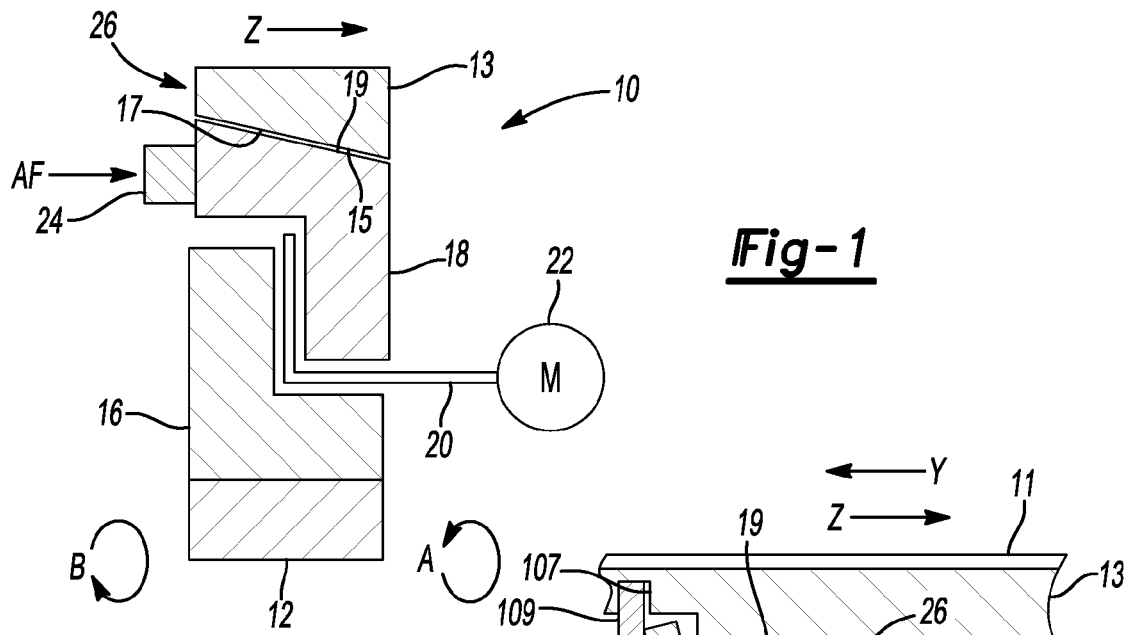
FIG. 1 is a schematic view of a torque transmitting device in accordance with an embodiment of the present invention.

Referring to the drawings, wherein like reference numbers refer to like components, in FIG. 1 a schematic view of a torque transmitting device 10 is illustrated between a first member 12 and a second member 13 in accordance with an embodiment of the present invention. The torque transmitting device 10 either transmits torque between the first member 12 and the second member 13 or allows relative rotation between the first member 12 and the second member 13 depending on the operating conditions, as will be described below. The first member 12 is generally cylindrical or annular in shape. In the example provided, the first member 12 is a ring gear of a planetary gear set in a transmission of an automobile. However, the first member 12 may be other gear members or other types of driven gears, shafts, or members disposed in other environments. The second member 13 is generally annular in shape and has a surface 15 that faces towards the first member 12 and decreases in diameter in a first axial direction Z. An annular profile of the surface 15 has two substantially straight lines so that the surface 15 defines a conical shaped bore 17. The surface 15 is preferably covered with or composed of a friction material. In the example provided, the second member 13 is a female cone of a cone clutch having splines 11 disposed on an outer diameter to rotationally fix the second member 13 to a transmission case of an automobile. In alternative embodiments, the second member 13 is the transmission case itself and the surface 15 is integrally formed with the transmission case.

The torque transmitting device 10 includes a first race 16 and a second race 18. In the example provided, the torque transmitting device 10 is a selectable one-way clutch. The first race 16 is rotatably coupled to the first member 12 and the second race 18 has a surface 19 that opposes and substantially matches an annular profile of the surface 15 of the second member 13. The surface 19 is preferably metal and allows the second race 18 to act as a male cone of the cone clutch. In the example provided, the torque transmitting device 10 allows the first race 16 to rotate relative to the second race 18 in a first direction A, and selectively transmits torque when the first race 16 rotates in a second direction B with respect to the second race 18. However, the torque transmitting device 10 may alternatively allow rotation in the second direction B and selectively transmit torque in the first direction A. In the example provided, the torque transmitting device 10 is a mechanical diode selectable one-way clutch. However, the torque transmitting device 10 may be of a different type without departing from the scope of the present invention. The materials, dimensions, and design of the torque transmitting device 10 determine a torque limit of the torque transmitting device 10. The torque limit is the largest amount of torque between the first race 16 and the second race 18 that the torque transmitting device 10 transmits without damaging the components of the torque transmitting device 10. Preferably, the torque limit is greater than a normal operating torque between the first member 12 and the second member 13.

The torque transmitting device 10 further includes a selector plate 20 disposed between the first race 16 and the second race 18 to selectively actuate the torque transmitting device 10, as will be described below. In the example provided, the selector plate 20 is positionable by an electric motor 22 to selectively actuate the torque transmitting device 10. The selector plate 20, however, may be positioned by other means without departing from the scope of the present invention. The selector plate 20 has stops with the torque transmitting device 10 to cause the selector plate 20 to rotate with the second race 18 when the second race 18 rotates with respect to the second member 13 to substantially maintain the alignment of the selector plate with the second race 18.

The torque transmitting device 10 further includes a biasing member 24 that biases the second race 18 of the torque transmitting device 10 in the first axial direction Z with a biasing force AF. In the example provided, the biasing member 24 is a disc spring. The biasing force AF urges the surface 19 of the second race 18 of the torque transmitting device 10 against the surface 15 of the second member 13 to form a fuse or a friction clutch 26. The friction clutch 26 is preferably not configured for selective actuation so that the friction clutch 26 is always engaged by the biasing member 24. In the example provided, the friction clutch 26 is a cone clutch. The cone clutch transfers a higher torque than plate or disk clutches of the same size due to the wedging action and increased surface area. The biasing force AF and the frictional properties of the surfaces 15, 19 contribute to a predetermined holding torque of the friction clutch 26. Exceeding the predetermined holding torque will result in the second race 18 rotating relative to the female cone of the cone clutch. In the example provided, the predetermined holding torque is about 50% greater than an expected maximum operating torque through the torque transmitting device 10 but less than an amount that would cause torque carrying elements within the torque transmitting device 10 to reach their yield limit.

During operation of the embodiment provided, the first member 12 is driven in either the first rotational direction A or the second rotational direction B by a component in the transmission of an automobile. The first member 12 transmits torque to the first race 16 of the torque transmitting device 10. When the first race 16 rotates in the first direction A with respect to the second race 18, the first race 16 does not transmit torque to the second race 18 and the first race 16 rotates freely. Similarly, when the first race 16 rotates in the second direction B and the torque transmitting device 10 is not actuated, the first race 16 rotates freely.

When the first race 16 rotates in the second direction B with respect to the second race 18 and the torque transmitting device 10 is actuated, however, the first race 16 transmits torque to the second race 18 in the second direction B. The second race 18 transmits torque to the second member 13 by friction between the surfaces 15, 19. When the torque through the friction clutch 26 exceeds the predetermined holding torque, such as during inadvertent actuation of the torque transmitting device 10, the friction clutch 26 slips such that the second race 18 rotates relative to the second member 13. Accordingly, only a reduced slipped torque is transmitted through the friction clutch 26. The predetermined holding torque is below the torque limit of the torque transmitting device 10. Because the second member 13 is fixed from rotation, the first member 12 is locked in the second direction B below the predetermined holding torque.

Figure 2:
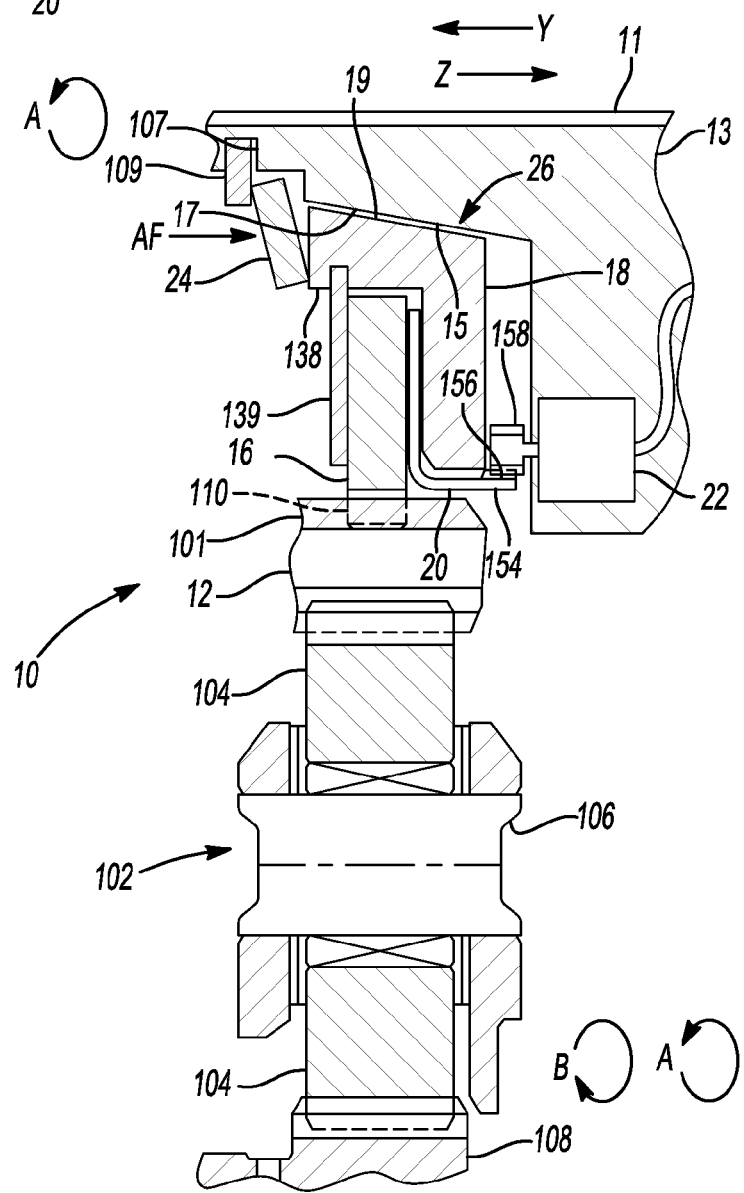
FIG. 2 is a side cross-sectional view of the torque transmitting device shown in FIG. 1 in an operating environment in accordance with an embodiment of the present invention.

Referring now to FIG. 2, a partial cross-sectional view of the torque transmitting device 10 in an exemplary operating environment is shown in accordance with an embodiment of the present invention. The torque transmitting device includes the first race 16, the second race 18, the selector plate 20, and the biasing member 24. The first member 12 is a gear member of a planetary gear set 102 and includes a plurality of splines 101. In the example provided, the splines 101 are disposed on an outer surface of the first member 12. The planetary gear set 102 further includes a plurality of planetary gears 104 that are supported on a carrier member 106 and are meshed with the first member 12 and a sun gear 108.

In the example provided, the second member 13 defines an annular groove 107. A retaining ring 109 is disposed within the annular groove 107 to provide a counter force to the biasing force AF of the biasing member 24 to bias the second race 18 of the torque transmitting device 10 in the first axial direction Z.

Referring generally to FIGS. 3-5, 6A, and 6B, a specific embodiment and configuration of the torque transmitting device 10 will be described. However, it should be appreciated that the configuration of the torque transmitting device 10 hereinafter described may vary without departing from the scope of the present invention. Turning to FIG. 3 and with continued reference to FIG. 2, an end view of the first race 16 of the torque transmitting device 10 is shown in accordance with an embodiment of the present invention. The first race 16 has a plurality of splines 110 that engage with the splines 101 of the first member 12 to rotatably couple the first race 16 to the first member 12. A first surface 112 opposes the second race 18 and defines a plurality of grooves 114. Each of the grooves 114 has an angled surface 116 and a wall surface 118 that extend axially into the first race 16 from the first surface 112, as is most easily seen in FIG. 6B.

Referring now to FIG. 4 and with continued reference to FIG. 2, an end view of the second race 18 of the torque transmitting device 10 is shown in accordance with an embodiment of the present invention. A second surface 130 of the second race 18 opposes the first surface 112 of the first race 16 and defines a plurality of grooves 132. With additional reference to FIG. 6A, the grooves 132 extend into the second race 18 from the second surface 130. A bottom surface 134 substantially opposes the first race 16 and a side wall 136 substantially faces the first direction A. In the example provided, the number of grooves 132 is the same as the number of grooves 114 in the first race 16. A third surface 138 of the second race 18 extends past the first race 16 in a second axial direction Y. An axial retention member 139 is connected to the third surface 138 to retain the first race 16 in the second axial direction Y.

An engagement member 140 is disposed in each of the grooves 132 of the second race 18 to selectively engage the torque transmitting device 10. The engagement members 140 are rotatable into the grooves 114 of the first race 16. The engagement members 140 each have a first surface 142 that substantially faces the first direction A, a second surface 144 that substantially faces the second direction B, and a third surface 146 that substantially faces the bottom surface 134 of the grooves 132 of the second race 18. When the torque transmitting device 10 is in a first position P1 the first surfaces 142 of the engagement members 140 oppose the wall surfaces 118 of the grooves 114 of the first race 16. When the torque transmitting device 10 is in a second position P2 as illustrated in FIG. 6B, the engagement members 140 are disposed substantially entirely within the grooves 132.

A plurality of biasing members 148 are disposed in the grooves 132 of the second race 18 to bias the engagement members 140 towards the first race 16. In the example provided, the biasing members 148 are torsion springs in contact with the bottom surface 134 of the grooves 132 and the third surface 146 of the engagement members 140. The biasing members 148, however, may be of another type or shape without departing from the scope of the present invention.

Referring now to FIG. 5 and with continued reference to FIGS. 2, 6, and 7, an end view of the selector plate 20 is shown in the second axial direction Y in accordance with an embodiment of the present invention. The selector plate 20 defines a plurality of windows 150 that are radially aligned with the engagement members 140 of the second race 18. Between the windows 150 are a plurality of selector portions 152 for positioning the engagement members 140 between an engaged state in accordance with the first position P1 and a disengaged state in accordance with the second position P2. An arm portion 154 is disposed on a radial interior portion of the selector plate 20 and extends past the second race 18 in the first axial direction Z. The arm portion 154 has a plurality of gear teeth 156 disposed around the circumference of the arm portion 154. The gear teeth 156 engage with a gear 158 of the electric motor 22 to rotate the selector plate 20 between the first position P1 and the second position P2. In the first position P1, the windows 150 are disposed over the engagement members 140 to engage the torque transmitting device 10.

The electric motor 22 actuates the torque transmitting device 10 by rotating the selector plate 20 in the first direction A so engagement members 140 are actuated into the grooves 132 and put the torque transmitting device 10 into the second position P2.

In the example provided, at least one stop 149 is located in the torque transmitting device 10 to the second direction B of the selector portion 152 of the selector plate 20. The stop 149 extends from the second surface 130 of the second race 18 towards the first race 16 to limit travel of the selector plate 20 with respect to the second race 18. The stops 149, however, may take different shapes and may be placed at different locations depending on desired clutch characteristics. Such desired clutch characteristics may include, for example, torque capacity, desired backlash, or a predetermined amount of travel between the second race 18 and the selector plate 20.

Referring to FIGS. 2-6B, the operation of the torque transmitting device 10 will now be described. When the first member 12 rotates in the first direction A, the splines 101 transmit torque to the splines 110 of the first race 16 of the torque transmitting device 10. The first race 16 of the torque transmitting device 10 is free to rotate in the first direction A relative to the second race 18. When the first member 12 rotates in the second direction B and the torque transmitting device 10 is deactivated, the torque is transmitted through the torque transmitting device 10 in the same path as when the first member 12 is rotating in the first direction A.

When the first member 12 rotates in the second direction B and the torque transmitting device 10 is engaged, however, torque is transmitted between the first member 12 and the second member 13. Specifically, the first member 12 transmits torque through the splines 101 to the splines 110 of the first race 16 of the torque transmitting device 10. The first race 16 transmits torque from the side wall 136 of the grooves 132 to the second surface 144 of the engagement members 140. The first surfaces 142 of the engagement members 140 transmit torque to the wall surfaces 118 of the grooves 114 in the second race 18 of the torque transmitting device 10. The second race 18 transmits up to the predetermined holding torque to the second member 13 by friction between the surfaces 15, 19. If the torque exceeds the predetermined holding torque, such as during inadvertent engagement of the torque transmitting device 10, the second race 18 will rotate relative to the second member 13 and transmit only a sliding or slipping torque therethrough. The stops within the torque transmitting device 10 rotate the selector plate 20 to substantially maintain alignment of the selector plate 20 with the second race 18. Because the second member 13 is fixed from rotation, the torque transmitting device 10 acts as a selectable one-way brake or lock to limit rotation of the first member 12 in the second direction B when the torque transmitting device 10 is engaged and the torque is less than the predetermined holding torque.

The present invention has many benefits over the prior art. One such advantage is protection of a selectable one-way clutch against damage upon inadvertent engagement. Furthermore, the present invention provides the protection without increasing hydraulic fluid demands on a vehicle transmission.

The description of the invention is merely exemplary in nature and variations that do not depart from the general essence of the invention are intended to be within the scope of the invention. Such variations are not to be regarded as a departure from the spirit and scope of the invention.

What is claimed is:

1. A torque transmitting device for transmitting a torque in a rotational direction between a first member and a second member, wherein the second member includes a surface that defines an annular bore having a decreasing diameter in an axial direction, the torque transmitting device comprising:

a first race rotationally coupled to the first member;

a second race opposing the first race and including a surface that opposes the surface of the second member, the surface having the decreasing diameter in the axial direction; and a biasing element that biases the second race against the second member with a predetermined force, and wherein the torque transmitting device selectively transmits torque in the rotational direction, and wherein the first race and the second race define a predetermined torque limit, and wherein the predetermined force contributes to a predetermined holding torque between the surface of the second race and the surface of the second member that is less than the predetermined torque limit between the first race and the second race, and wherein the second race rotates with respect to the second member when the torque exceeds the predetermined holding torque.

2. The torque transmitting device of claim 1, wherein the surface of the second race is substantially conical in shape.

3. The torque transmitting device of claim 1, wherein the predetermined holding torque is about 50% more than a maximum expected operating torque between the first member and the second member.

4. The torque transmitting device of claim 1, wherein the second member is a female cone of a cone clutch, and wherein the female cone is splined along an outer diameter to a transmission case.

5. The torque transmitting device of claim 1, wherein the biasing member permanently biases the second race in the axial direction.

6. The torque transmitting device of claim 5, wherein the biasing member is a disc spring.

7. The torque transmitting device of claim 1, further including a selector plate disposed between the first race and the second race to selectively actuate the torque transmitting device, and wherein the selector plate has at least one stop with the second race to substantially maintain alignment with the second race when the torque exceeds the predetermined holding torque.

8. The torque transmitting device of claim 7, wherein the at least one stop is disposed on the second race and extends from the surface of the second race towards the first race.

9. The torque transmitting device of claim 1, wherein the first member is a rotatable member and the second member is a stationary member.

10. The torque transmitting device of claim 9, wherein the stationary member is one of a portion of a transmission case and a stationary member that is rotatably coupled to a transmission case in a vehicle transmission.

11. The torque transmitting device of claim 9, wherein the rotatable member is a gear member of a planetary gear set in a vehicle transmission.

12. An assembly for transmitting a torque in a rotational direction, the assembly comprising:

a first member;

a second member including a surface that defines an annular bore having a decreasing diameter in an axial direction;

a selectable one-way clutch disposed within the annular bore and including a first race rotationally coupled to the first member and a second race opposing the first race and adjacent to the second member, the one-way clutch having a predetermined torque limit and the second race having a surface that opposes the surface of the second member, wherein the surface of the second race has about the decreasing diameter in the axial direction, and wherein the selectable one-way clutch selectively transmits the torque in the rotational direction; and a biasing element that biases the second race of the selectable one-way clutch against the second member with a predetermined force, and wherein the predetermined force contributes to a predetermined holding torque between the surface of the second race of the one-way clutch and the surface of the second member that is less than the predetermined torque limit of the one-way clutch, and wherein the second race rotates with respect to the second member when the torque exceeds the predetermined holding torque.

13. The assembly of claim 12, wherein the annular bore is substantially conical in shape.

14. The assembly of claim 12, wherein the predetermined holding torque is about 50% more than a maximum expected operating torque between the first member and the second member.

15. The assembly of claim 12, wherein the second member is a female cone of a cone clutch, and wherein the female cone is splined along an outer diameter to a transmission case.

16. The assembly of claim 12, wherein the biasing member permanently biases the second race of the selectable one-way clutch in the axial direction.

17. The assembly of claim 16, wherein the biasing member is a disc spring.

18. The assembly of claim 12, further including a selector plate disposed between the first race and the second race of the selectable one-way clutch to selectively actuate the selectable one-way clutch, and wherein the selector plate has at least one stop with the selectable one-way clutch to substantially maintain alignment with the second race of the selectable one-way clutch when the torque exceeds the predetermined holding torque.

19. The assembly of claim 18, wherein the at least one stop is disposed on the second race and extends from the surface of the second race towards the first race.

20. The assembly of claim 12, wherein the first member is a rotatable member and the second member is a stationary member.

21. The assembly of claim 20, wherein the stationary member is one of a portion of a transmission case and a stationary member that is rotatably coupled to a transmission case in a vehicle transmission.

22. The assembly of claim 20, wherein the rotatable member is a gear member of a planetary gear set in a vehicle transmission.

23. An assembly disposed in a vehicle transmission for transmitting a torque in a rotational direction, the assembly comprising:

a gear member of a planetary gear set;

a female cone member that is one of a portion of a transmission case and a stationary member that is rotatably coupled to a transmission case in a vehicle transmission, the female member including a surface that circumscribes the gear member and defines an annular bore having a substantially conical shape;

a selectable one-way clutch disposed within the annular bore and including a first race rotationally coupled to the gear member and a second race opposing the first race and adjacent to the female cone member, the one-way clutch having a predetermined torque limit and the second race having a surface that opposes the surface of the female cone member and has about the conical shape in the axial direction, wherein the selectable one-way clutch selectively transmits the torque in the rotational direction;

a selector plate disposed between the first race and the second race of the selectable one-way clutch and rotatable by an electric motor, the selector plate having at least one stop with the one-way clutch; and a disc spring that biases the second race of the selectable one-way clutch in the axial direction and against the female cone member with a predetermined force, and wherein the predetermined force contributes to a predetermined holding torque between the surface of the second race of the one-way clutch and the surface of the female cone member that is less than the predetermined torque limit of the one-way clutch, and wherein the second race rotates with respect to the female cone member when the torque exceeds the predetermined holding torque, and wherein the stops rotate the selector plate and the selector plate overruns the electric motor when the second race rotates with respect to the transmission case.

* * * * *